United States Patent
Hartney et al.

(10) Patent No.: US 9,517,892 B2
(45) Date of Patent: Dec. 13, 2016

(54) RETURN ROLLER BATTERY FOR CONVEYOR BELTS

(71) Applicant: RULMECA CANADA LIMITED, Wallaceburg (CA)

(72) Inventors: Joseph Hartney, Wallaceburg (CA); Lucas Morse, Wallaceburg (CA); Christopher Duchene, Tupperville (CA); Jocelin Boyer, Wallaceburg (CA); William Benedict, Chatham (CA)

(73) Assignee: RULMECA CANADA LIMITED, Wallaceburg, Ontario (CA)

( * ) Notice: Subject to any disclaimer, the term of this patent is extended or adjusted under 35 U.S.C. 154(b) by 0 days.

(21) Appl. No.: 14/884,225

(22) Filed: Oct. 15, 2015

(65) Prior Publication Data

US 2016/0107842 A1    Apr. 21, 2016

Related U.S. Application Data

(60) Provisional application No. 62/064,128, filed on Oct. 15, 2014.

(51) Int. Cl.
*B65G 39/12* (2006.01)
*B65G 15/60* (2006.01)

(52) U.S. Cl.
CPC ............... *B65G 39/12* (2013.01); *B65G 15/60* (2013.01); *B65G 2812/02168* (2013.01)

(58) Field of Classification Search
CPC ................... B65G 15/60; B65G 39/12; B65G 2812/02168
USPC .................................................. 198/842, 843
See application file for complete search history.

(56) References Cited

U.S. PATENT DOCUMENTS

| 4,202,437 | A | | 5/1980 | Gordon | |
|---|---|---|---|---|---|
| 5,657,857 | A | * | 8/1997 | Neilson | B65G 15/00 193/35 R |
| 6,186,073 | B1 | | 2/2001 | Reitsch, Jr. | |
| 7,549,531 | B2 | * | 6/2009 | Hosch | B65G 21/105 198/493 |
| 7,971,705 | B2 | * | 7/2011 | Jabber | B65G 15/00 198/824 |
| 8,387,781 | B2 | * | 3/2013 | Mott | B65G 15/60 198/842 |

FOREIGN PATENT DOCUMENTS

CN                202464714 U    10/2012

* cited by examiner

*Primary Examiner* — Gene Crawford
*Assistant Examiner* — Keith R Campbell (57) ABSTRACT

A return roller battery has a plurality of idler rollers rotatably attached at either end to opposing mounting plates. The mounting plates are rotatably attached to a conveyor belt frame and selectively rotated by a crank mechanism to position one of the idler rollers beneath the conveyor belt to support the belt. A locking mechanism secures the mounting plates against rotation when an idler roller is in position.

7 Claims, 8 Drawing Sheets

RETURN ROLLER BATTERY FOR CONVEYOR BELTS

FIELD OF THE INVENTION

The present invention relates to conveyor belt systems and, in particular, to return roller batteries.

BACKGROUND

Conveyor belts are widely used in a diverse set of industrial and commercial applications. In some applications, the conveyor belt is supported on the underside, on its return trip in the opposite direction, by idler rollers called return rollers.

Many industrial operations, such as mining or other resource extraction operations, rely on conveyor belts to move large quantities of heavy material between processing steps in the operation. Many of these operations produce low-cost resources and depend on large high-speed, high-volume conveyor belt systems to provide the necessary throughput to make the operation profitable. In such operations, machine maintenance, including maintenance of the conveyor belt, and the resulting downtime, is carefully planned and scheduled to maximize productivity and, thus, profitability of the operation.

High wear is a significant problem for idler-type rollers in a conveyor belt system and can lead to costly unscheduled downtime as a result of wear-related failure or the need for replacement. When a roller requires unscheduled maintenance, the entire conveyor belt system, and often all associated processes, must be shut down to access and replace the roller. The financial cost to an operation, associated with a process-wide shutdown, can be unacceptably high.

Accordingly, there is a need for devices that enable real time replacement of worn idler rollers, during conveyor operations, to prevent or reduce unscheduled downtime of conveyor belts, due to wear-related failure of idler rollers.

SUMMARY OF THE INVENTION

In order to meet the above need, one aspect of the present invention is a return roller battery comprising a plurality of idler rollers rotatably attached at either end to opposing mounting plates, which can be selectively rotated and operationally secured in place, between opposing structural brackets mounted on a conveyor belt frame. This permits an operator to replace an unserviceable idler roller by rotating a serviceable idler roller into the operating position to support the conveyor belt.

BRIEF DESCRIPTION OF THE DRAWINGS

In order that the invention may be more clearly understood, preferred embodiments thereof will now be described in detail, by way of example, with reference to the accompanying drawings, in which.

DESCRIPTION OF THE PREFERRED EMBODIMENT

As used herein, the term "battery" refers to a plurality or set of idler rollers arranged and connected as described herein.

Figure 1:
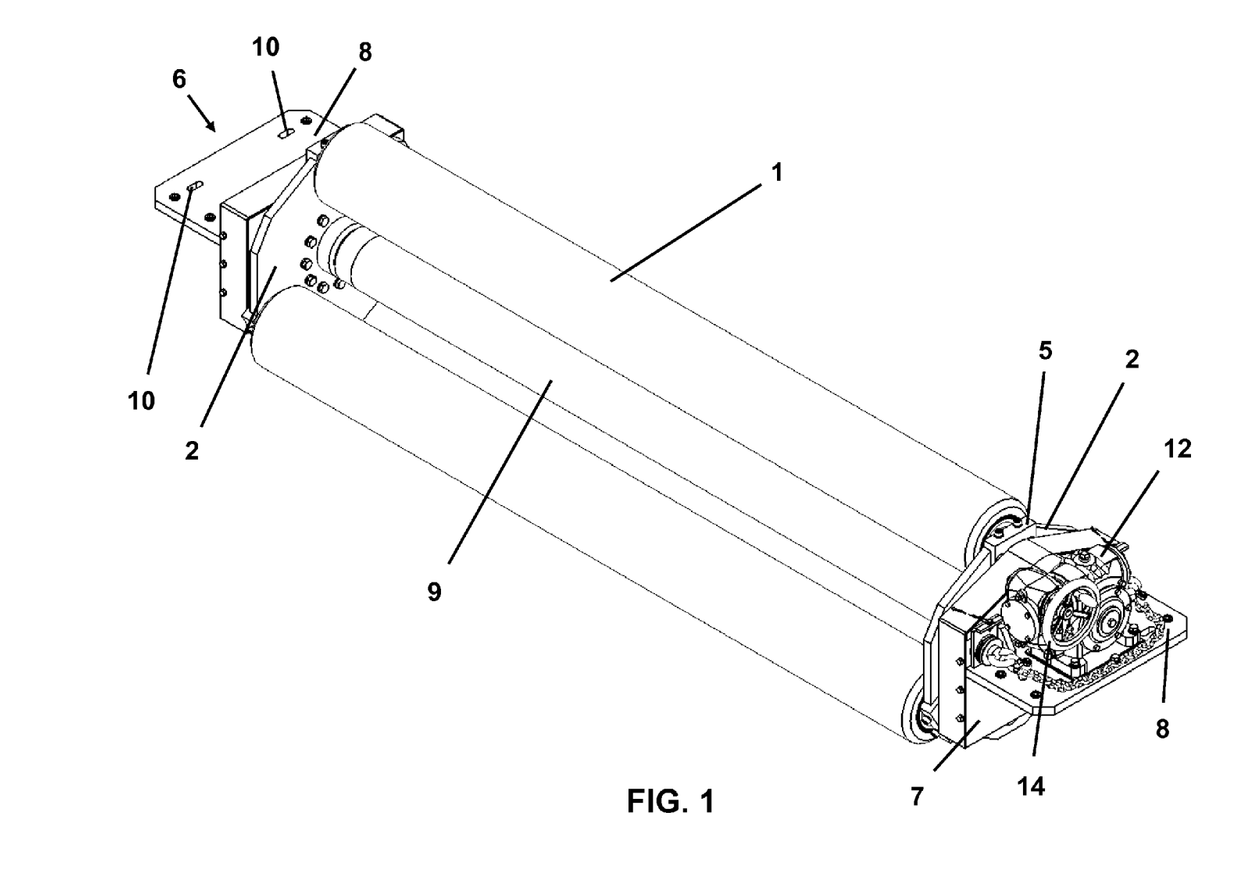
FIG. 1 is a perspective view of the return roller battery according to the present invention.
Figure 2:
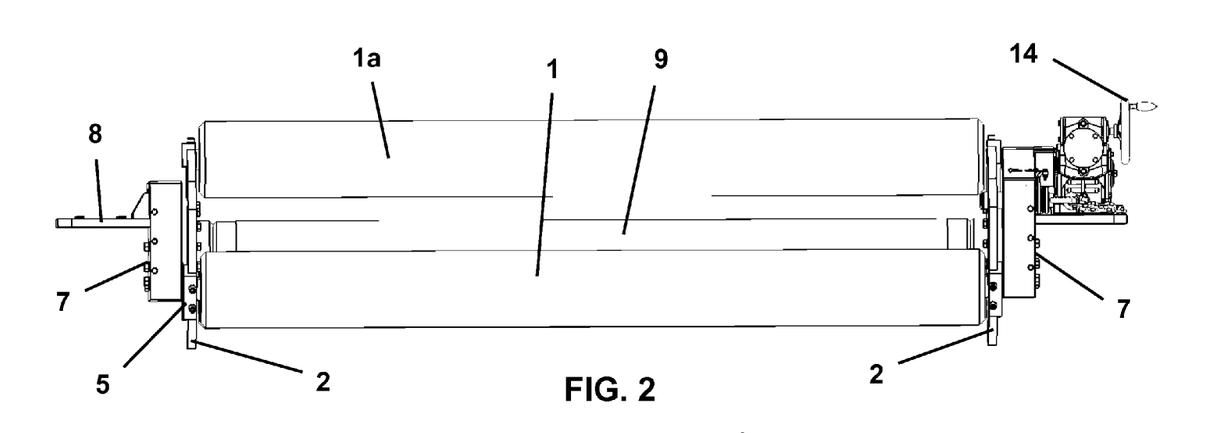
FIG. 2 is a side view of the return roller battery, showing an idler roller in the operating position.
Figure 3:
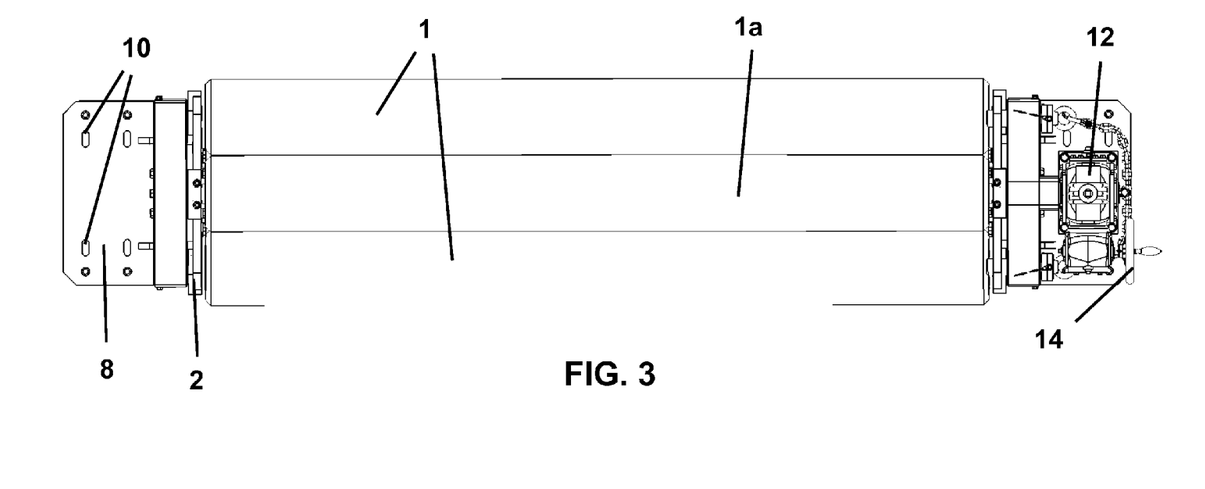
FIG. 3 is a top view of the return roller battery, showing an idler roller in the operating position.
Figure 6:
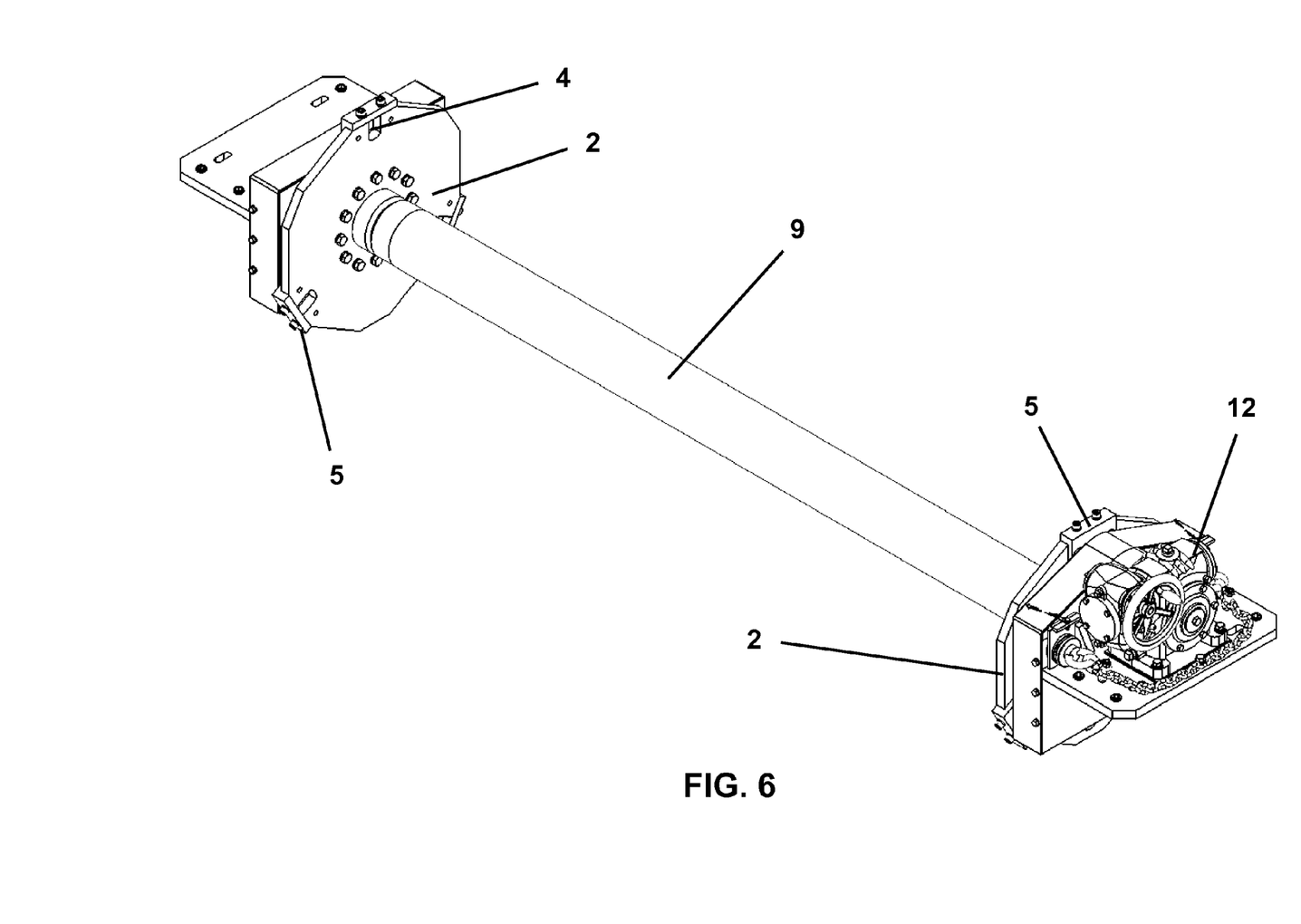
FIG. 6 is a perspective view of the return roller battery, shown in FIG. 1, with the idler rollers removed.
Figure 7:
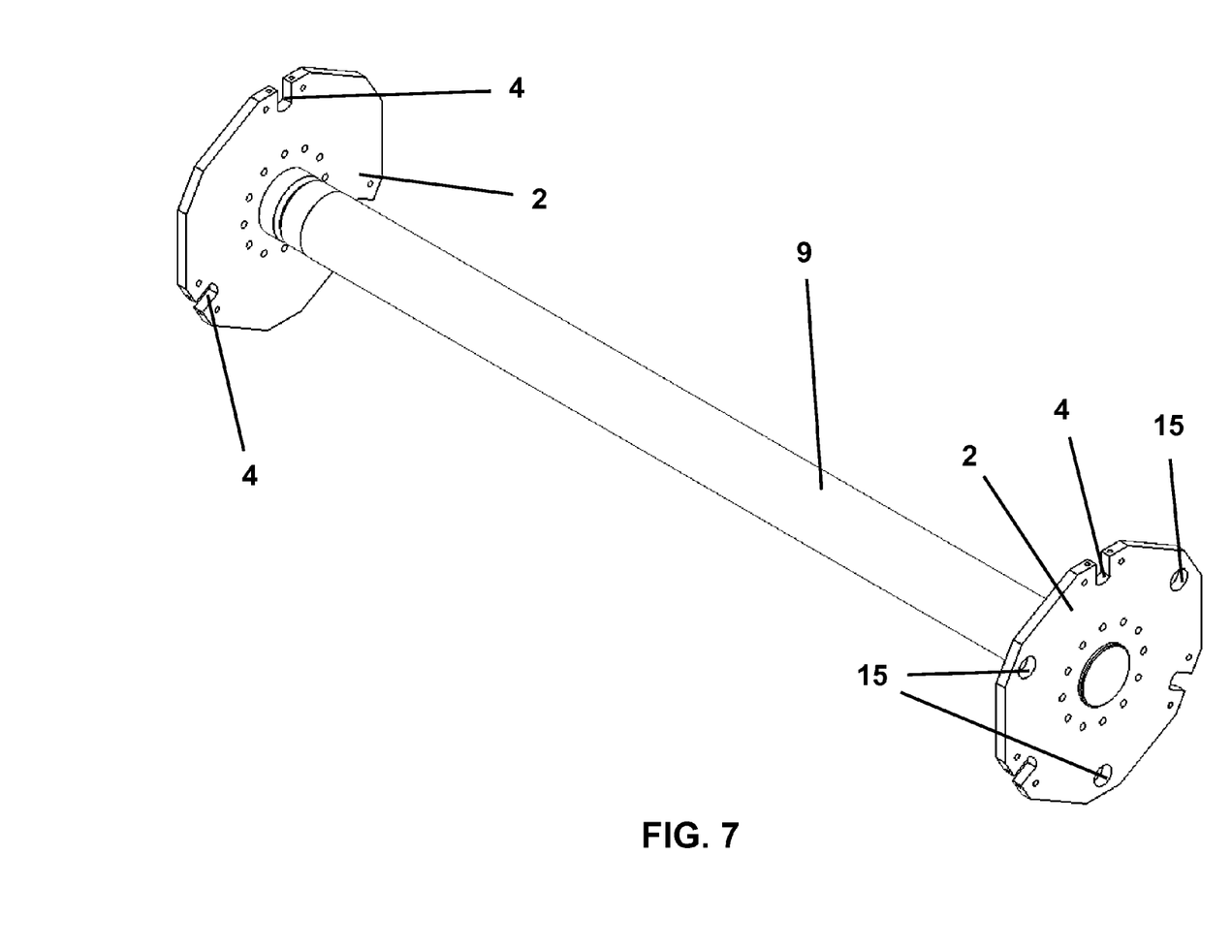
FIG. 7 is a perspective view of only the mounting plates and the shaft of the return roller battery, in the same orientation as they appear in FIGS. 1 and 6.
Figures 8, 9:
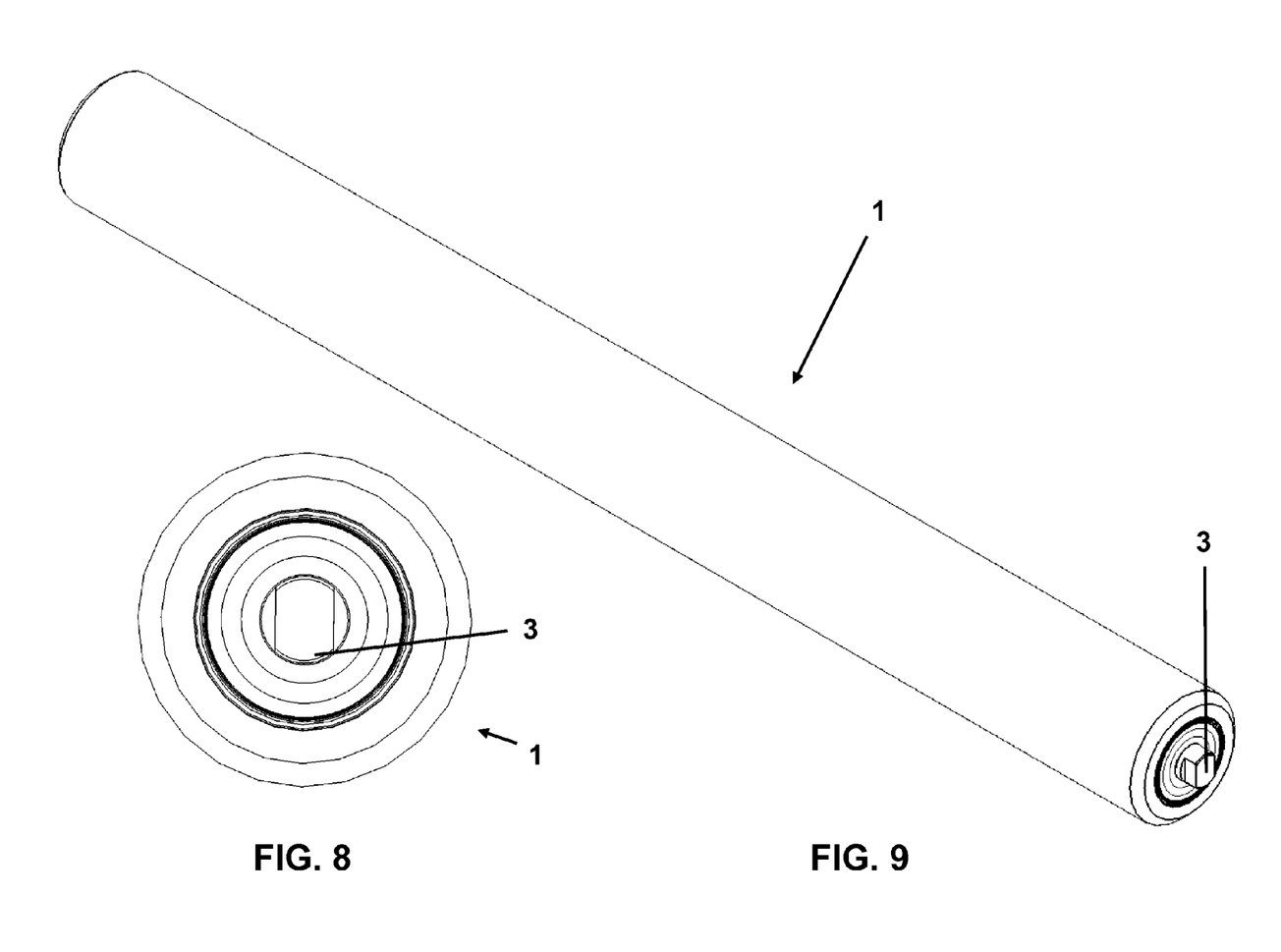
FIG. 8 is an end view of an idler roller of the return roller battery.
FIG. 9 is a perspective view of an idler roller of the return roller battery.

A preferred embodiment of a return roller battery, according to the present invention, is shown in FIGS. 1-3. The return roller battery has a plurality of idler rollers 1, rotatably attached at either end between opposing mounting plates 2. Preferably, as shown in FIGS. 1-3, the return roller battery has three idler rollers 1, but other configurations of idler rollers 1 may be used, as long as the adjacent rollers do not interfere with one another, during operation of the conveyor belt system. Any type of idler roller, suitable for use as a return roller, may be used. Preferably, the idler rollers 1 are flat rubber covered rollers, such as, for example, Rulmeca™ CEMA-C Flat Return Full Rubber Cover rollers. Each idler roller 1 has a mounting shaft 3 on both ends, which is attached to rotary bearings (not shown) in both ends of the idler roller 1. As shown in FIGS. 1, 6, and 7, the mounting shaft 3 fits within a roller receiving slot 4 in the mounting plates 2 and is secured therein by a bracket 5, which is bolted over the open end of the slot 4. Preferably, the ends of the mounting shaft 3 have a cross section that is elongated with rounded ends, or pill-shaped, and fit longitudinally in the slot 4, as shown in FIGS. 8 and 9. Other configurations are possible for the ends of the mounting shaft 3, such as, for example, a flat, square, or hexagonal cross-section.

The mounting plates 2 may be of any shape to accommodate the set of idler rollers 1 that are mounted circumferentially thereon and equidistant from one another. Preferably, rounded or hexagonal, as shown in FIG. 7. The slots 4 are evenly spaced about the peripheral edge of the mounting plate 2.

Opposing structural brackets 6 are rigidly attached to the frame structure of the conveyor belt system on either side of the conveyor belt, to locate and attach the return roller battery in position beneath the conveyor belt. Each structural bracket 6 has a vertical flange 7 and a horizontal flange 8. In the preferred embodiment, shown in FIGS. 1, 2, and 4A, the horizontal flange 8 is attached perpendicularly to the vertical flange 7 and has suitable attachment structures for rigidly attaching the structural bracket to the frame structure of the conveyor belt (not shown), such as apertures 10 for bolting the horizontal flange 8 to the top flat portion of an I-beam of the conveyor belt frame. Set screws may be used to ensure the frame is level.

The opposing mounting plates 2 are mounted at each end on a shaft 9, for example, by way of rotary bearings. This permits the rotation of both plates 2 on the shaft 9 by means of a gear mechanism, as described below.

Figure 4A:
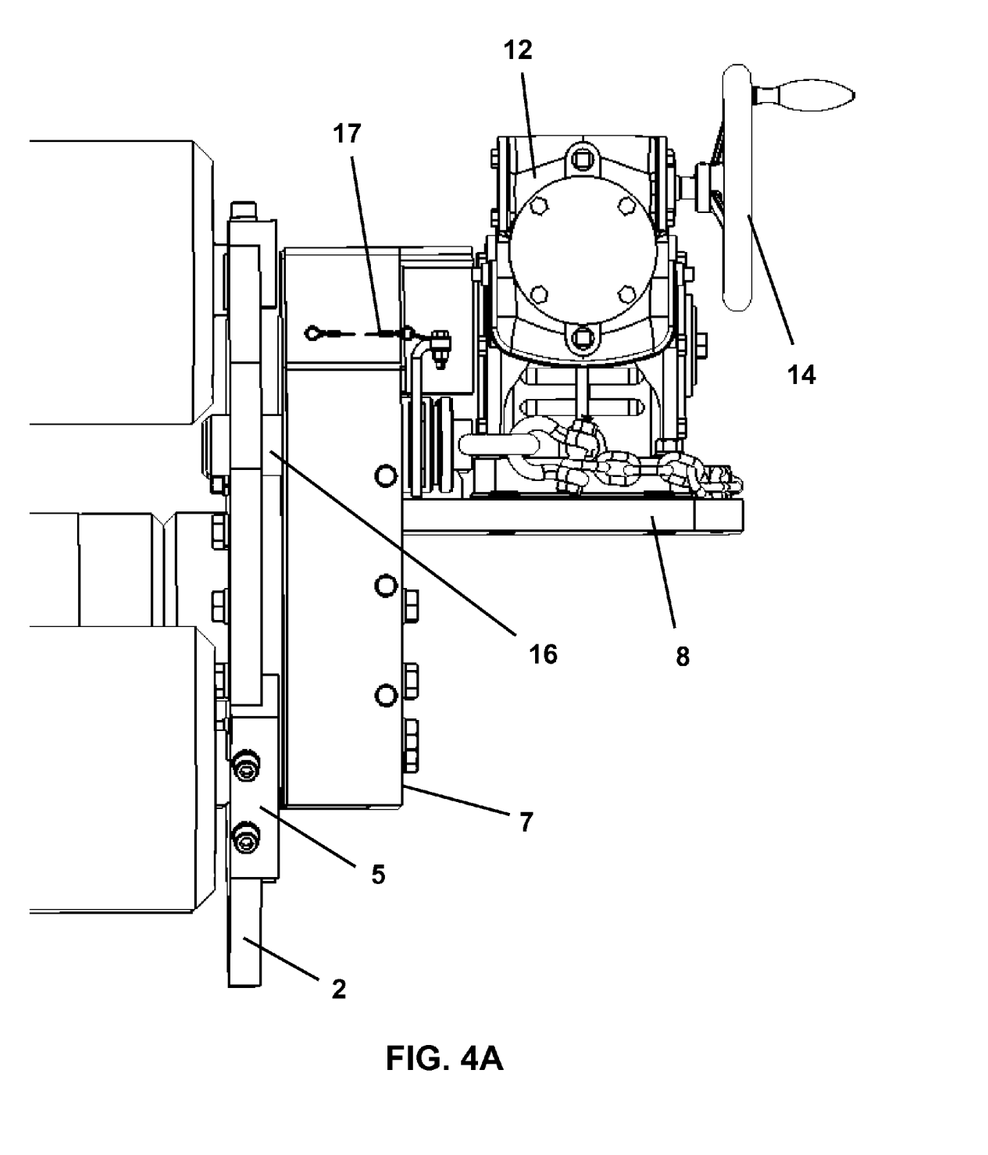
FIG. 4A is a side view of an end of the return roller battery.
Figure 4B:
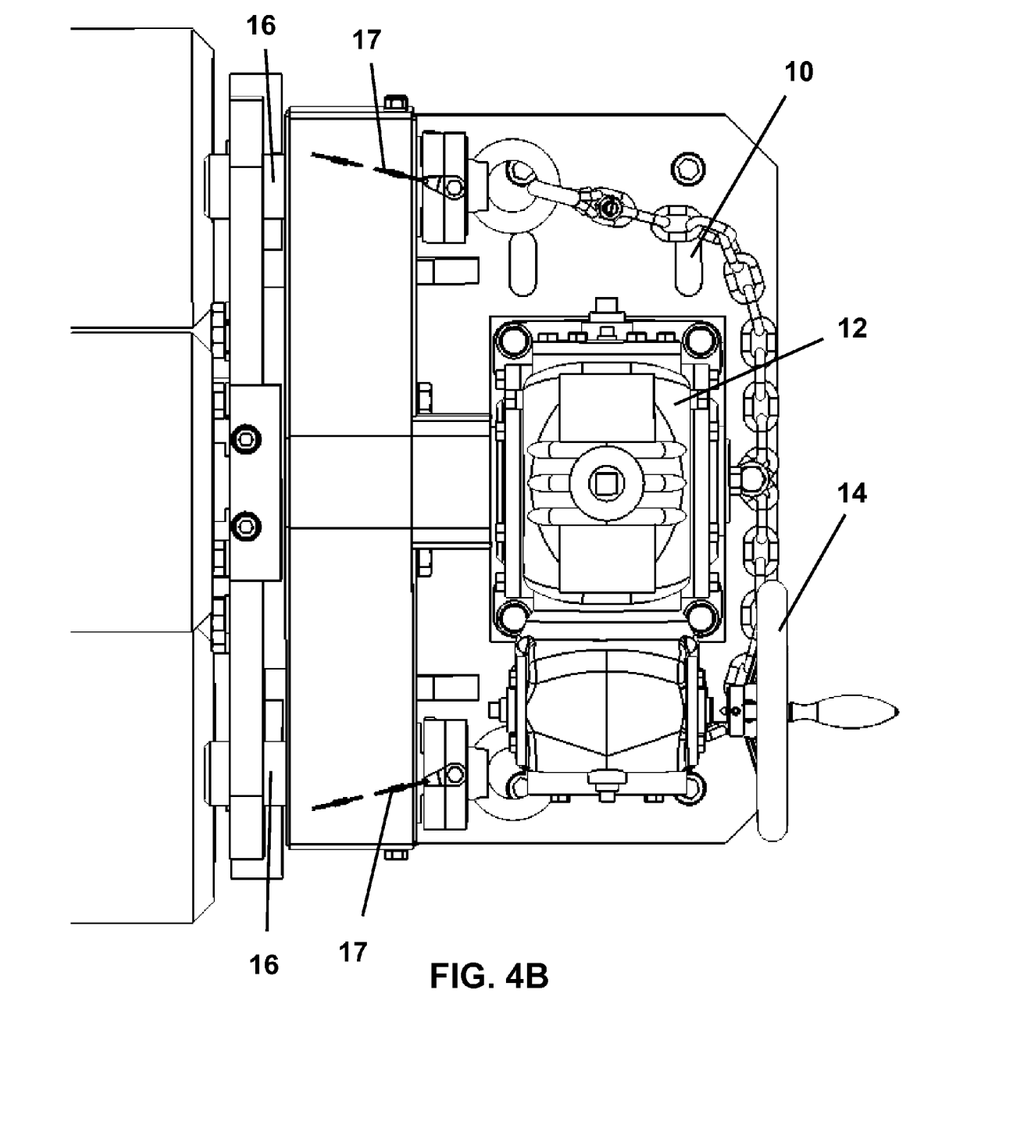
FIG. 4B is a top view of the end of the return roller battery shown in FIG. 4A.
Figure 5:
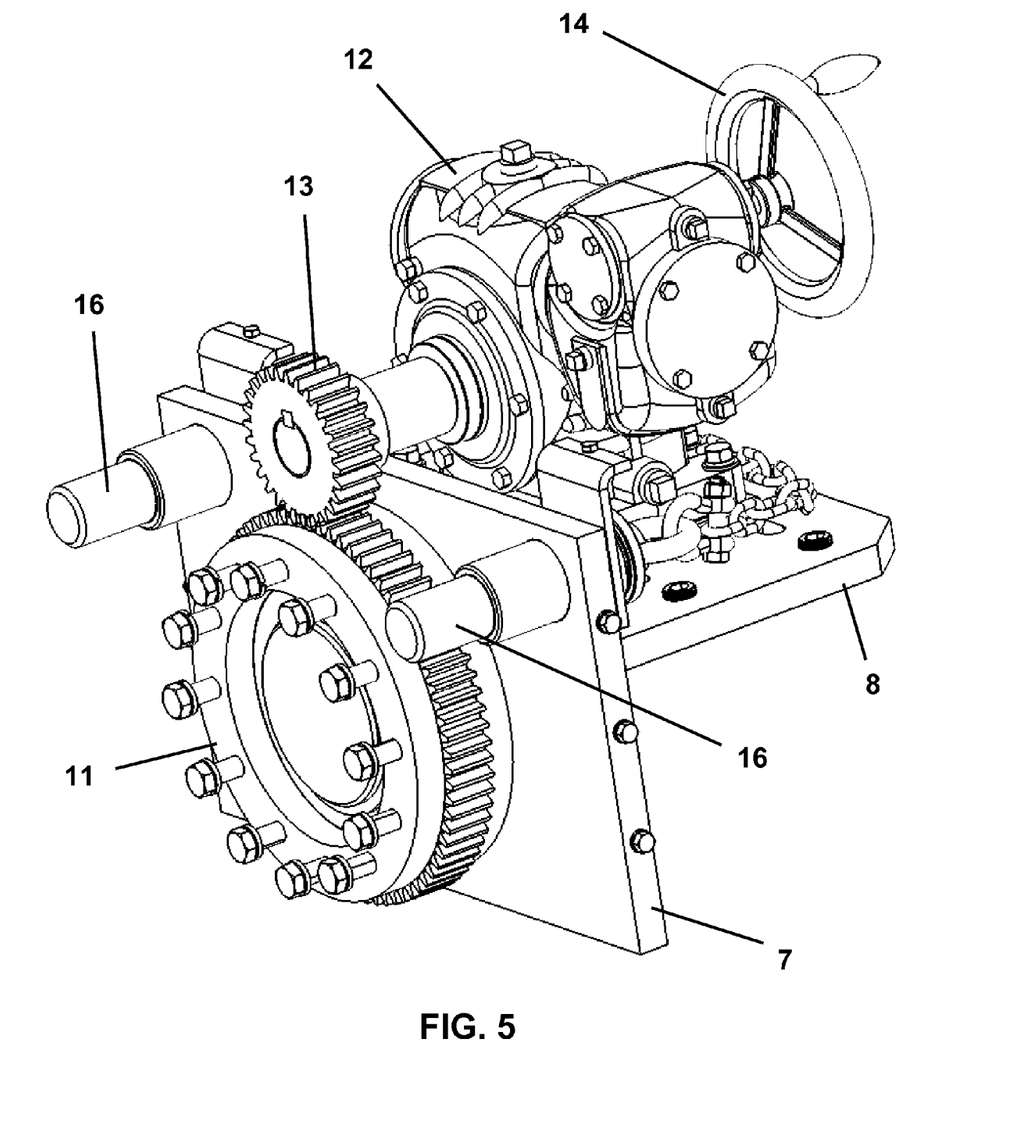
FIG. 5 is a perspective view of the gear mechanism of the return roller battery at the end shown in FIGS. 5A and 5B, with the cover removed to expose the gears.

As shown in FIGS. 4A, 4B, and 5, one side of the return roller battery is adapted to enable the rotation of the mounting plates 2 about the axis of the shaft 9. A circular, large diameter, first gear 11 is rigidly attached to the mounting plate 2. The center of the first gear 11 is axially aligned with the shaft 9, which enables the gear rotary force to rotate the mounting plates 2 about the axis of the shaft 9. A gearbox 12 is mounted on the horizontal flange 8 and is operable to rotate a small diameter second gear 13, which acts as the actuating gear and operatively engages with the first gear 11, thereby rotating the mounting plates 2. Preferably, the first and second gears 11 and 13 are either spur gears or helical gears, but may be any other suitable type of gear mechanism. Preferably, the first and second gears 11 and 13 are covered to prevent material from the conveyor dropping onto the gears and interfering with their operation.

To change rollers, an operator turns a crank wheel 14 to operate the second gear 13 and rotate the mounting plates 2 to reposition the next idler roller 1 under the conveyor belt. The gearbox 12 may be provided with a plurality of gears or other similar mechanisms to reduce the force required to operate the crank wheel 14. Alternatively, the gearbox 12 may be provided with a motor, thereby eliminating the need for manual operation of the crank wheel 14.

FIGS. 2 and 3 show the return roller battery with idler roller 1a in the operating position. An idler roller 1 is in the operating position when it is at the highest vertical point in its rotation relative to the conveyor belt frame and is supporting the weight of the conveyor belt.

Preferably, the mounting plate 2 on the same side as the gearbox 12 has a plurality of apertures 15, as shown in FIG. 7. The apertures 15 are peripherally arranged so as to receive locking pins 16, passing through the vertical flange 7, which align with the apertures 15 when an idler roller 1 is in the operating position. The locking pins lock the mounting plate 2 with respect to the vertical flange 7 and prevent any rotation of the mounting plate 2. The locking pins 16, thereby, lock the idler roller 1 in position. Preferably, two locking pins 16 are used, each passing through a guide hole on opposite ends of the vertical flange 7, and held in place by a retainer, such as a leash 17, as shown in FIGS. 4A and 4B.

During operation of a conveyor belt using the return roller battery, according to the present invention, the idler roller 1 in the operating position is the only one in contact with and supporting the weight of the belt. This idler roller 1 will experience wear and eventually require replacement. Once replacement becomes necessary, the return roller battery permits an operator to position a new idler roller 1 in the operating position by retracting the locking pins 16 from the apertures 15, thereby disengaging the mounting plate 2 from the vertical flange 7. The wheel 14 is operated to rotate and position the next idler roller 1 is in the operating position. The locking pins 16 are re-inserting into the corresponding apertures 15 to lock the mounting plate 2 in place with a new idler roller 1 in the operating position.

Having a plurality of idler rollers 1 in a return roller battery, in place of a single idler roller 1, minimizes downtime by permitting quick and easy replacement or worn idler rollers 1. This is advantageous in extremely high wear applications where the longest lasting, heavy duty idler rollers may wear out between scheduled downtime. In less demanding applications, two criteria—the longevity of each idler roller 1 and the number of idler rollers 1 in the return roller battery—may be selectively adjusted such that the last idler roller 1 in the return roller battery will not wear out between scheduled downtime. During scheduled downtime, the worn idler rollers 1 on the return roller battery may be replaced by removing the bracket 5 and sliding the mounting shaft 3 out of the slots 4 to removing each worn idler roller 1. The mounting shaft 3 of a new idler roller 1 may then be inserted into the slots 4 and the brackets 5 bolted over the open end of the slots 4 to secure each new idler roller 1 in place. Thereafter, the return roller battery will have a fresh complement of new idler rollers 1, which will last until the next scheduled downtime.

A number of embodiments of the present invention have been described. Nevertheless, it will be understood that various modifications may be made without departing from the spirit and scope of the invention described herein.

What is claimed is:

1. A return roller battery comprising a plurality of idler rollers rotatably attached at each end to opposing mounting plates, wherein the opposing mounting plates are rotatably attached to a conveyor belt frame, a crank mechanism operatively engaged with at least one of the opposing mounting plates to selectively rotate the mounting plates relative to the conveyor belt frame and a locking mechanism operatively engaged with at least one of the opposing mounting plates to secure the mounting plates against rotation relative to the conveyor belt frame, and wherein the plurality of idler rollers are mounted circumferentially and equidistant from one another about the peripheral edge of the opposing mounting plates.

2. The return roller battery of claim 1, wherein the plurality of idler rollers is three idler rollers.

3. The return roller battery of claim 1, wherein the opposing mounting plates are rotatably attached to the conveyor belt frame by way of structural brackets rigidly attached to the conveyor belt frame and rotatably attached to the opposing mounting plates.

4. The return roller battery of claim 3, wherein the opposing mounting plates are rotatably mounted on a shaft extending between and attached to the structural brackets.

5. The return roller battery of claim 4, wherein the crank mechanism comprises a first gear rigidly attached to one of the opposing mounting plates with the center of the first gear axially aligned with the shaft, a gearbox attached to the structural bracket adjacent the one of the opposing mounting plates having a second gear operatively engaged with the first gear to transfer rotary force from the gearbox to the opposing mounting plates, and a crank wheel operatively engaged with the gearbox.

6. The return roller battery of claim 4, wherein the crank mechanism comprises a first gear attached to one of the opposing mounting plates with the center of the first gear axially aligned with the shaft, a gearbox attached to the structural bracket adjacent the one of the opposing mounting plates having a second gear operatively engaged with the first gear to transfer rotary force from the gearbox to the opposing mounting plates, and a motor operatively engaged with the gearbox.

7. The return roller battery of claim 4, wherein the locking mechanism comprises at least one locking pin, at least one first aperture in at least one of the structural brackets, and a plurality of second apertures through at least one of the opposing mounting plates, wherein the first and second apertures are positioned so as to receive the at least one locking pin when one of the plurality of idler rollers is at the highest vertical point in its rotation relative to the conveyor belt frame, thereby preventing relative motion between the opposing mounting plates and the structural brackets and locking the idler roller in position.

* * * * *